United States Patent
Roca-Ribas Vives et al.

(10) Patent No.: US 9,879,709 B2
(45) Date of Patent: Jan. 30, 2018

(54) CONSTITUENT DEVICE FOR FURNITURE

(71) Applicants: Maria Roca-Ribas Vives, Barcelona (ES); Erika Biarnés Osorio, Barcelona (ES)

(72) Inventors: Maria Roca-Ribas Vives, Barcelona (ES); Erika Biarnés Osorio, Barcelona (ES)

(*) Notice: Subject to any disclaimer, the term of this patent is extended or adjusted under 35 U.S.C. 154(b) by 39 days.

(21) Appl. No.: 14/901,457

(22) PCT Filed: Apr. 14, 2014

(86) PCT No.: PCT/ES2014/070310
§ 371 (c)(1),
(2) Date: Dec. 28, 2015

(87) PCT Pub. No.: WO2014/207275
PCT Pub. Date: Dec. 31, 2014

(65) Prior Publication Data
US 2016/0123365 A1    May 5, 2016

(30) Foreign Application Priority Data

Jun. 27, 2013 (ES) .................................. 201330971

(51) Int. Cl.
*F16B 12/42* (2006.01)
*A47B 13/02* (2006.01)
(Continued)

(52) U.S. Cl.
CPC ............ *F16B 12/42* (2013.01); *A47B 13/021* (2013.01); *F16B 12/10* (2013.01); *F16B 12/44* (2013.01); *A47B 87/0246* (2013.01); *A47B 91/00* (2013.01)

(58) Field of Classification Search
CPC .......... F16B 12/42; F16B 12/10; F16B 12/44; A47B 13/021; A47B 87/0246; A47B 91/00
(Continued)

(56) References Cited

U.S. PATENT DOCUMENTS 2,880,047 A * 3/1959 Haag ...................... A47B 91/00
108/19
3,533,586 A * 10/1970 Chichester, Jr. ........ A47B 13/06
148/DIG. 119
(Continued)

FOREIGN PATENT DOCUMENTS

| DE | 20216700 | 2/2003 |
|----|----------|--------|
| GB | 1376075 | 12/1974 |
| WO | WO 2014/207275 | 12/2014 |

OTHER PUBLICATIONS

International Search Report dated Jul. 29, 2015 From the Oficina Española de Patentes y Marcas Re. Application No. PCT/ES2014/070310 and Its Translation Into English.

*Primary Examiner* — Anita M King

(57) ABSTRACT

Constituent device for furniture which comprises a base, a strut, an elastic means and a fixing means such that the base and the strut are joined to each other and in a notably perpendicular mutual position and the elastic means is in a position interposed in the joining region between the base and the strut and said elastic means being fixedly connected on the strut and also connected in a movable position close to the joining between the base and the strut, in which said elastic means is enabled and in a suitable position for the interposition between the same and the base of a notably flat exterior body, and the fixing means has the capacity to fix to said elastic means in an immovable and rigid position with the notably flat exterior body embedded and tightened between the elastic means and the base.

20 Claims, 22 Drawing Sheets

(51) Int. Cl.
*F16B 12/10* (2006.01)
*F16B 12/44* (2006.01)
*A47B 91/00* (2006.01)
*A47B 87/02* (2006.01)

(58) Field of Classification Search
USPC .......................... 248/188.8, 188.1; 108/156
See application file for complete search history.

(56) References Cited

U.S. PATENT DOCUMENTS

| | | | | |
|---|---|---|---|---|
| 4,879,800 A | * | 11/1989 | Rumman | A47B 3/06 108/156 |
| 7,588,295 B2 | * | 9/2009 | Goodman | A47B 13/02 248/188.91 |
| 2005/0126452 A1 | | 6/2005 | Ziakin | |

* cited by examiner

FIG.20
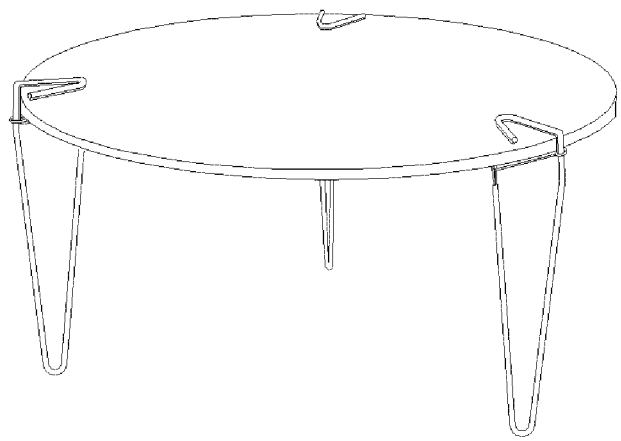
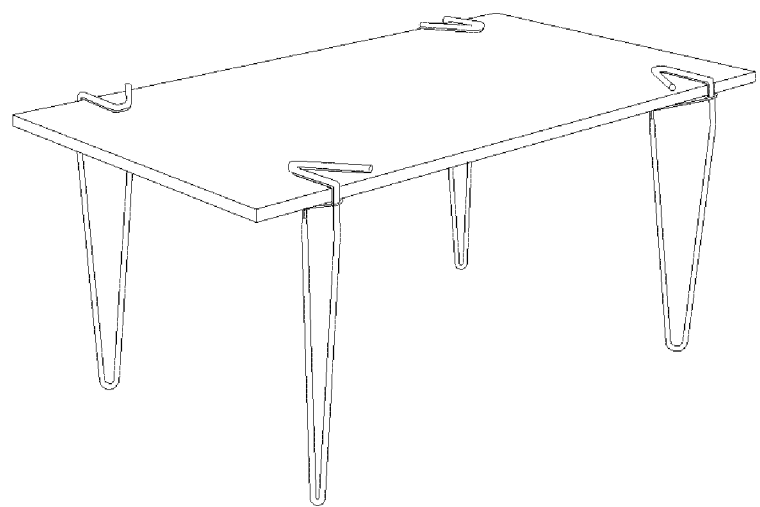

CONSTITUENT DEVICE FOR FURNITURE

RELATED APPLICATIONS

This application is a National Phase of PCT Patent Application No. PCT/ES2014/070310 having International filing date of Apr. 14, 2014, which claims the benefit of priority of Spanish Patent Application No. P201330971, filed on Jun. 27, 2013. The contents of the above applications are all incorporated by reference as if fully set forth herein in their entirety.

FIELD AND BACKGROUND OF THE INVENTION

The object of the present patent application for an invention is to register a constituent device for furniture, which incorporates notable innovations and advantages compared with the techniques used hitherto.

More specifically, the invention proposes the development of a constituent device for furniture, which due to the particular arrangement thereof, allows the coupling and decoupling thereof on flat surfaces of various thicknesses in a rapid and stable manner.

Different accessories intended to be coupled and decoupled on flat surfaces of different thicknesses are known in the current prior art in order to form furniture such as for example lamps or shelves.

On occasions, it is necessary to meet different requirements to form furniture. Such elements which form furniture can be of a very disparate nature and the requirements that these have can also correspond to very different uses, consequently the mechanisms used and known hitherto are not always suitable for the coupling and decoupling thereof.

Such devices are capable of being coupled and decoupled on flat surfaces using mechanisms already known, such as clamps which provide speed for coupling and decoupling, however, little stability in the fixing thereof or screw clamps which provide stability in the fixing thereof, however, do not provide speed in coupling and decoupling, etc.

The present invention helps to solve and overcome this present problem, since it allows coupling and decoupling of a device adaptable to different thicknesses of a flat surface to form furniture, providing speed in coupling and decoupling and in turn achieving high stability in the fixing thereof. All of which is solved in a simple manner in which few pieces are involved and therefore the industrialization thereof is simpler and more economic.

The present invention provides a high degree of freedom in the positioning thereof since it can be positioned in different positions and/or orientations, allowing multiple uses and needs of the user to be solved.

SUMMARY OF THE INVENTION

The present invention has been developed with the aim of providing a constituent device for furniture which is essentially characterized by the fact that it comprises a base, a strut, an elastic means and a fixing means such that the base and the strut are joined to each other and in a notably perpendicular mutual position and the elastic means is in a position interposed in the joining region between the base and the strut and said elastic means being fixedly connected on the strut and also connected in movable position close to the joining between the base and the strut, in which said elastic means is enabled and in a suitable position for the interposition between the same and the base of a notably flat exterior body, and the fixing means has the capacity to fix to said elastic means in an immovable and rigid position with the notably flat exterior body embedded and tightened between the elastic means and the base.

Preferably, in the constituent device for furniture, the fixing means is implemented by a tensor fixed at one of the ends thereof on the base or the strut, the other end of the tensor being adjustable in a movable position on the base, strut or elastic means, such that the tensor itself passes through and is supported by the elastic means and transmitting tension to said elastic means.

Alternatively, in the constituent device for furniture, the tensor is notably similar to a cord.

Preferably, in the constituent device for furniture, the base and the strut form one single piece.

Alternatively, in the constituent device for furniture, the base and/or the strut have a tubular arrangement with a notably circular section.

Alternatively, in the constituent device for furniture, the base and/or the strut have an elongated arrangement with a notably rectangular transversal section.

Alternatively, in the constituent device for furniture, the base and/or the strut have a laminar elongated arrangement.

Additionally, the constituent device for furniture comprises a continuous pressure or tightening means, capable of conferring continuous pressure or tightening on the fixing means and said fixing means can remain fastened and adjusted.

Preferably, in the constituent device for furniture, the elastic means is implemented by a tubular element in the manner of a fork such that the bifurcated ends of the fork are inserted immovably and together in the strut and the other single end or vertex of said fork being movably connected in the joining region between the base and the strut in a position displaceable in relation to the proximity thereof to the base.

Similarly, in the constituent device for furniture, the single end or vertex of the fork is joined to a ring annularly displaceable through the strut.

Preferably, in the constituent device for furniture, the elastic means is implemented by a tubular element in the manner of a fork such that the bifurcated ends of the fork are inserted immovably and together in a projection made for such purpose in the strut and the other end or vertex of said fork being movably connected in the joining region between the base and the strut in a position displaceable in relation to the proximity thereof to the base.

Alternatively, in the constituent device for furniture, the single end or vertex of the fork is joined to a ring annularly displaceable through a bolt, said bolt being situated and fixed between the base and the projection.

Preferably, in the constituent device for furniture, the elastic means is implemented by an element in the manner of a flat spring such that one of the ends thereof is immovably inserted in the strut and the other end of said flat spring being movably connected in the joining region between the base and the strut in a position displaceable in relation to the proximity thereof to the base.

In addition to this, in the constituent device for furniture, the flat spring has a hole close to the movable connection region thereof with the strut, and it has, in another close position at the immovably inserted end, a notably elongated opening with a progressive narrowing.

Moreover, in the constituent device for furniture, the strut has, in the region thereof close to the joining thereof with the base, an elongated notch such that the movable end of the flat spring is passed through and introduced into said notch and said movable end being displaceable in the direction marked by the notch.

Alternatively, in the constituent device for furniture, the fixing means is implemented by a tensor fixed on the section close to one of the ends thereof on the base, such that the tensor passes through the interior of the ring and the section of the tensor close to the other end is adjustable and fixable in the working gap between the bifurcated ends of the fork in a position close to the immovable region of said bifurcated ends.

Preferably, in the constituent device for furniture, the fixing means is implemented by a tensor fixed on the section close to one of the ends thereof on the base such that the tensor passes through the interior of the hole and the section of the tensor close to the other end is adjustable and fixable in the working gap resulting from the progressive narrowing of the notably elongated opening.

Moreover, in the constituent device for furniture, the fork and the ring form one single piece.

Additionally, in the constituent device for furniture, the notably flat exterior body is the flat surface of a type of furniture such as a table.

In addition to this, in the constituent device for furniture, the notably flat exterior body is the flat surface of a type of furniture such as a shelf.

Owing to the present invention, the problem set out is solved and overcome since it allows the coupling and insertion of a device adaptable to different thicknesses of the surface of various types of furniture, into a notably flat surface of any dimension, form or material and for multiple uses and needs of the user.

Coupling onto and decoupling from the furniture element is carried out in a simple and very fast manner and in few seconds without the need for tools, however, without damaging the notably flat surface of the furniture. It can be coupled on any point of the perimeter of the notably flat surface, in different orientations and positions of the piece, also providing a high degree of freedom for designing and forming furniture.

Other characteristics and advantages of the constituent device for furniture of the present invention will be evident from the description of a preferred, but non-exclusive embodiment, which is illustrated in an exemplary and non-limiting manner in the drawings which are included, in which:

BRIEF DESCRIPTION OF THE DRAWINGS

FIG. 20 are indicative views of the use as a leg of a table of a preferred embodiment of the constituent device for furniture of the present invention.

DESCRIPTION OF SPECIFIC EMBODIMENTS OF THE INVENTION

As is shown in the figures, the constituent device for furniture comprises a base 11, a strut 12, an elastic means and a fixing means such that the base 11 and the strut 12 are joined to each other and in a notably perpendicular mutual position and the elastic means is in a position interposed in the joining region between the base 11 and the strut 12 and said elastic means being fixedly connected on the strut 12 and also connected in movable position close to the joining between the base 11 and the strut 12, in which said elastic means is enabled and in a suitable position for the interposition between the same and the base 11 of a notably flat exterior body 7, and the fixing means has the capacity to fix to said elastic means in an immovable and rigid position with the notably flat exterior body 7 embedded and tightened between the elastic means and the base 11.

The object of the proposed invention has different preferred embodiments.

One possible preferred embodiment can be that described in FIGS. 1 to 8.

Figure 1:
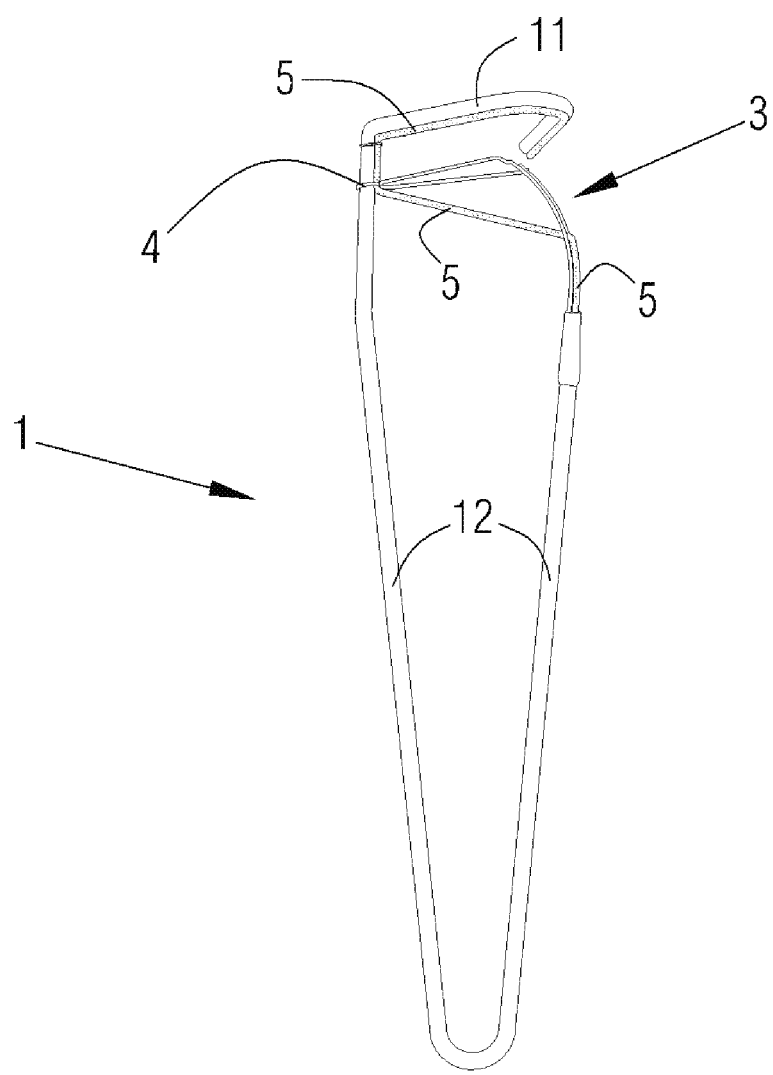
FIGS. 1 and 2 are general views and from different perspectives of a preferred embodiment of the constituent device for furniture of the present invention.
Figure 2:
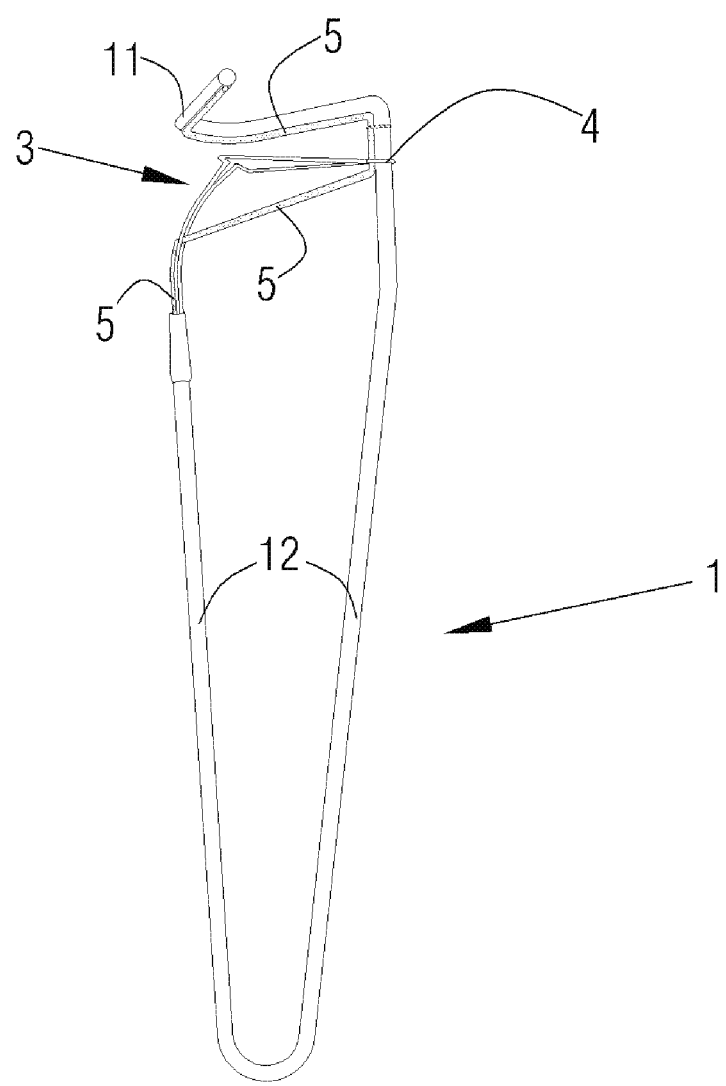
Figure 4:
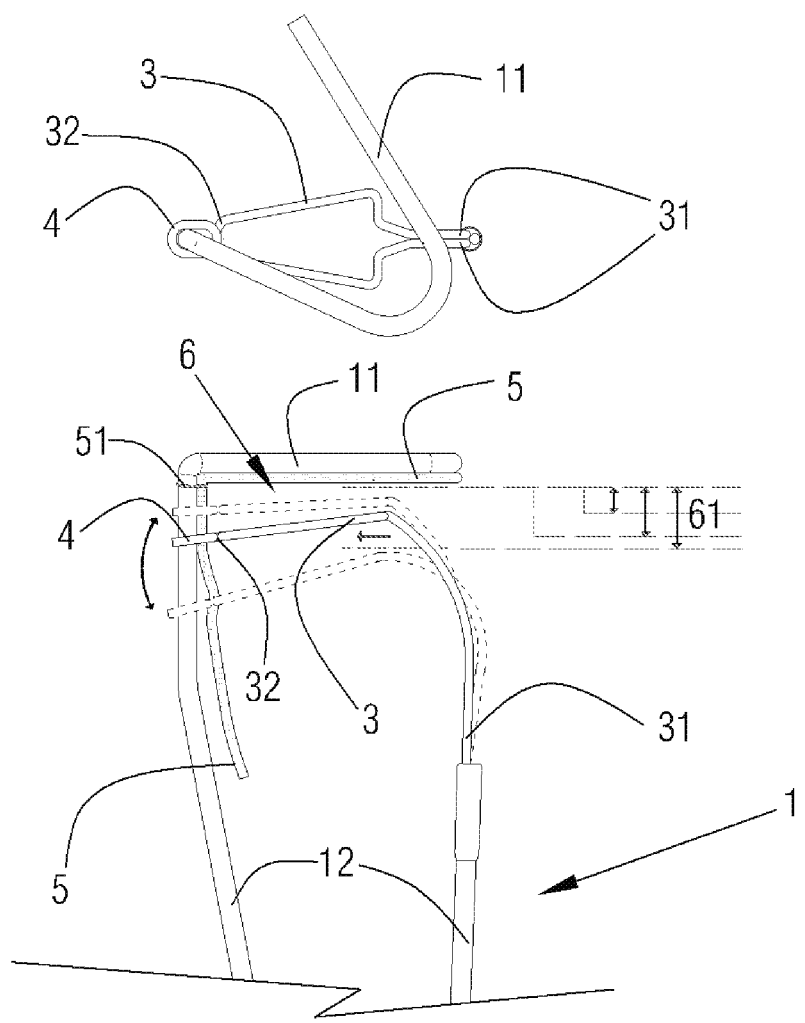
FIG. 4 is a plan and elevation view of a preferred embodiment of the constituent device for furniture of the present invention depicted in FIGS. 1 to 8, and of the different positions of the elastic means for the insertion of a notably flat body.

As can be especially observed in FIGS. 1, 2 and 4 in this preferred embodiment, the base 11 and the strut 12 form one single tubular piece 1 with notably circular section.

In this embodiment, the elastic means are implemented by a tubular element in the manner of a fork 3 and with an elastic nature. As can be observed in greater detail in FIG. 3 and the expanded details thereof, the bifurcated ends 31 of the fork 3 are inserted and fixed together in the strut 12 (in this preferred embodiment at one end of the tubular piece 1 in which the strut 12 is integrated).

The other single end or vertex 32 of the fork 3 is movably connected in the region of the tubular piece 1 close to the joining between the base 11 and the strut 12. Said connection is implemented by a ring 4.

Figure 3:
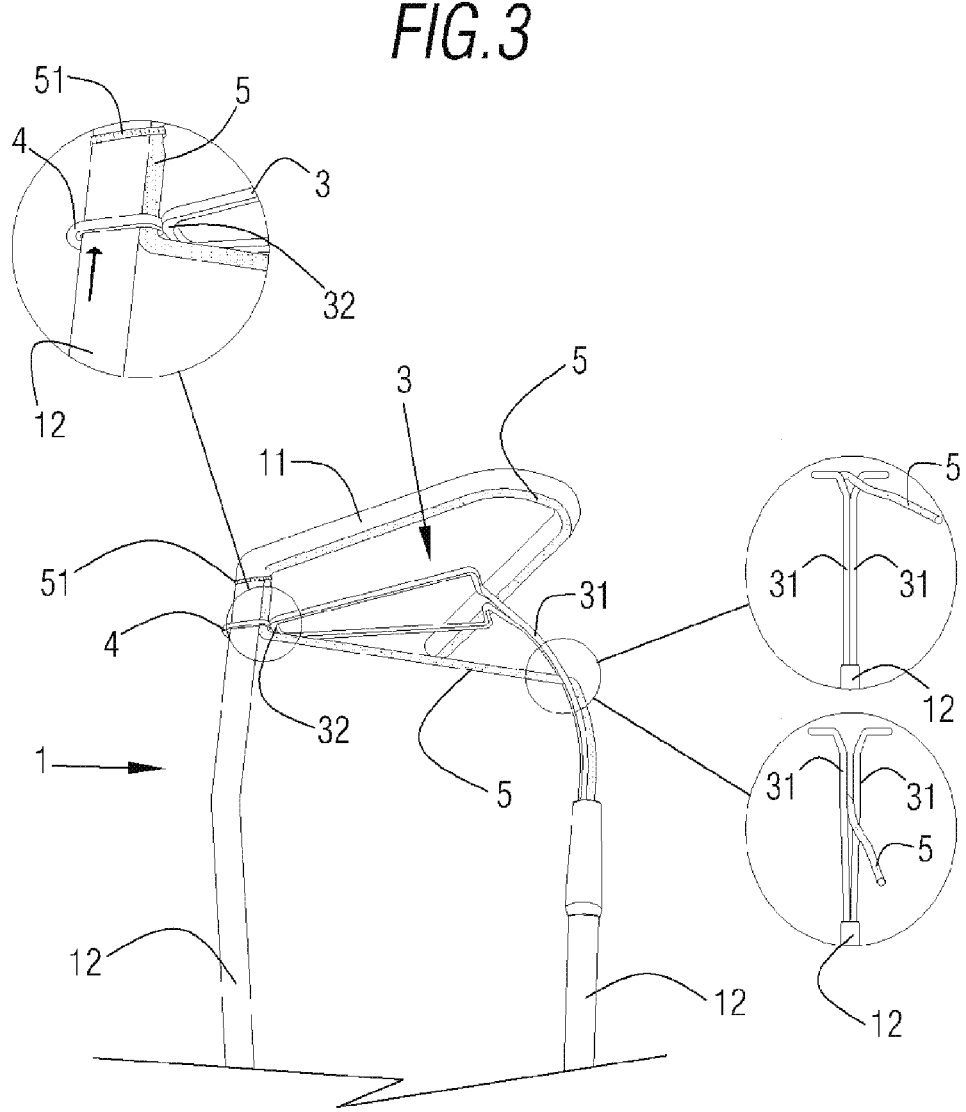
FIG. 3 is a view with details of the elastic means and of the fixing means of a preferred embodiment of the constituent device for furniture of the present invention.

Said ring 4 is joined to the single end or vertex 32 of the fork 3 and the tubular piece 1 is annularly inserted into the ring 4 in the region of said tubular piece 1 close to the joining between the base 11 and the strut 12 and therefore has a position displaceable in relation to the proximity thereof to the base 11, as can be observed by the arrow in the expanded detail of FIG. 3.

In this preferred embodiment, the fork 3 and the ring 4 can form a single piece.

The fixing means is implemented by a tensor 5, immovable in the section thereof close to one of the ends thereof on the base 11, as is observed in greater detail in FIG. 3. A washer 51 tightened on the tensor 5 helps to ensure the immovability of said section of the tensor 5 on the base 11.

As can be observed in the figures, the tensor 5 is similar to a cord.

The tensor 5 can also pass through the interior of the ring 4 in a coaxial and simultaneous manner and contiguously to the tubular piece 1 consisting of the base 11 and the strut 12, as can especially be observed in the expanded detail of FIG. 3.

After its passage through the interior of the ring 4, the tensor 5 continues its course until being introduced, adjusted and fixed in the working gap between the bifurcated ends 31 of the fork 3, in a position close to the insertion of said bifurcated ends 31 in the strut 12 (in this preferred embodiment, at one end of the tubular piece 1 consisting of the base 11 and the strut 12), as can be observed in the expanded details of FIG. 3.

As can be observed in FIG. 4 (with a plan and elevation depiction to aid a better understanding thereof), the different positions of the ring 4 indicated by the arrow involve determining the different states of bending and positioning of the fork 3 (said different states are depicted by lines in FIG. 4) and also determining the width 61 of the useful space 6 between the fork 3 and the base 11 and consequently adapting it to the thickness of the notably flat exterior body 7 which is desired to be introduced (depicted by lines in the figures where they appear).

In the succession of FIGS. 5 to 8, it can be observed how the user should manually proceed to introduce and adjust the notably flat exterior body 7 as desired in the useful space 6 between the fork 3 and the base 11.

Figure 5:
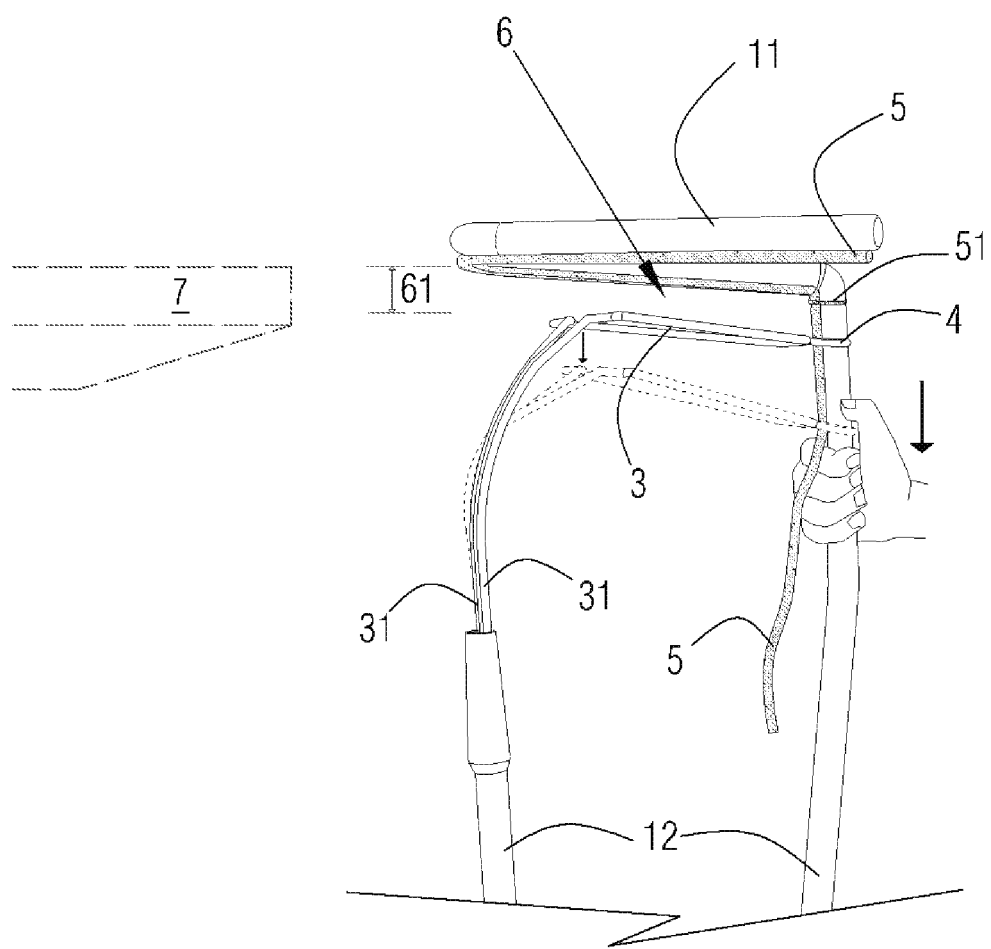
FIGS. 5, 6, 7 and 8 are sequential views of how the user should proceed to use a preferred embodiment of the constituent device for furniture of the present invention.
Figure 6:
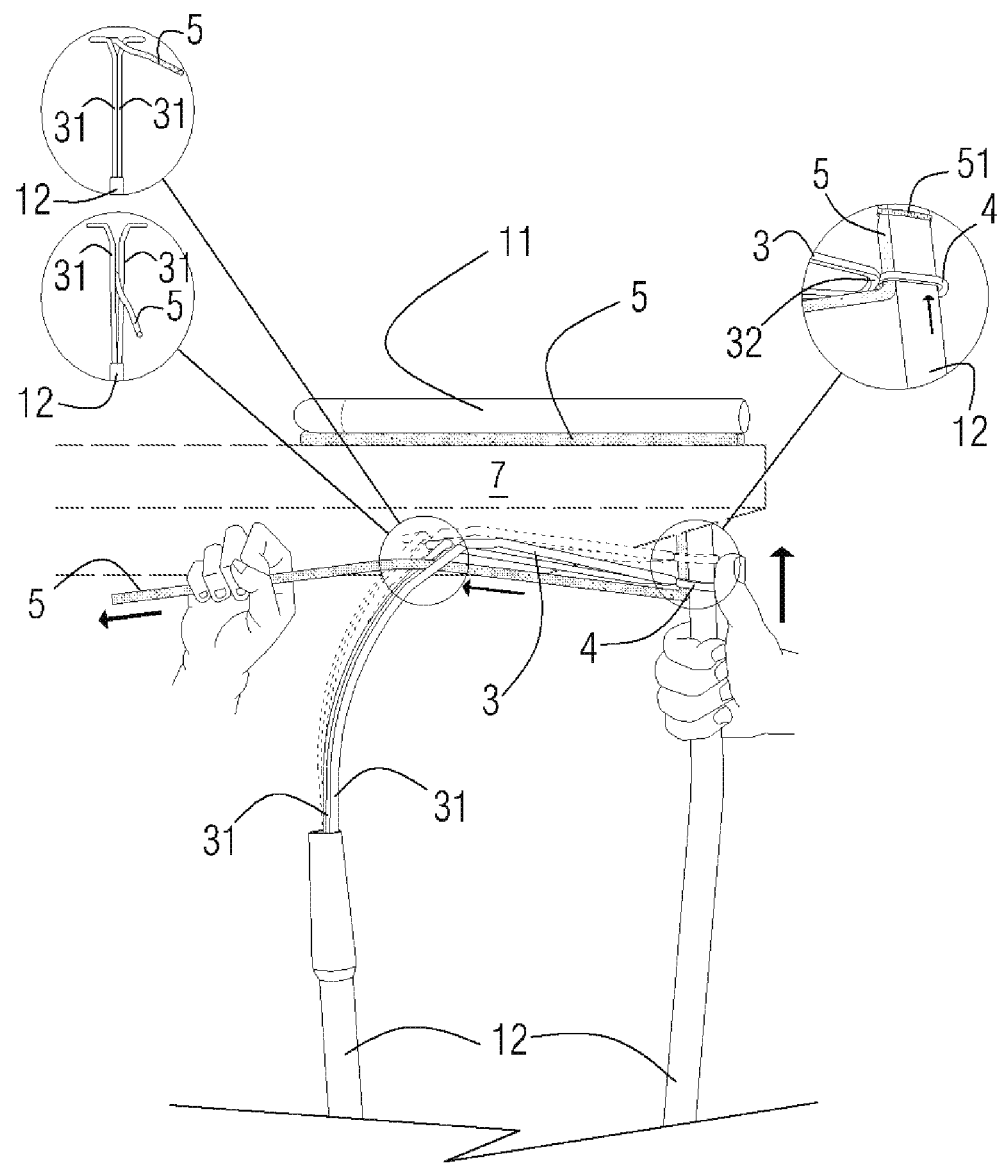

The user, as is visualized in FIG. 5, should manually push the ring 4 in the direction indicated by the arrow and therefore bending the fork 3 to the position depicted by lines, increasing the width 61 of the useful space 6 until the notably flat exterior body 7 can pass and be housed in the useful space 6 which is between the base 11 and the fork 3, as can also be observed in FIG. 6.

Below, once the notably flat exterior body 7 has been housed in the useful space 6, the user should manually push the ring 4 in the direction indicated by the arrow in FIG. 6 as well as the expanded detail thereof until the fork 3 is in the position depicted by lines and suitably tightens the notably flat exterior body 7 against the base 11.

Figure 7:
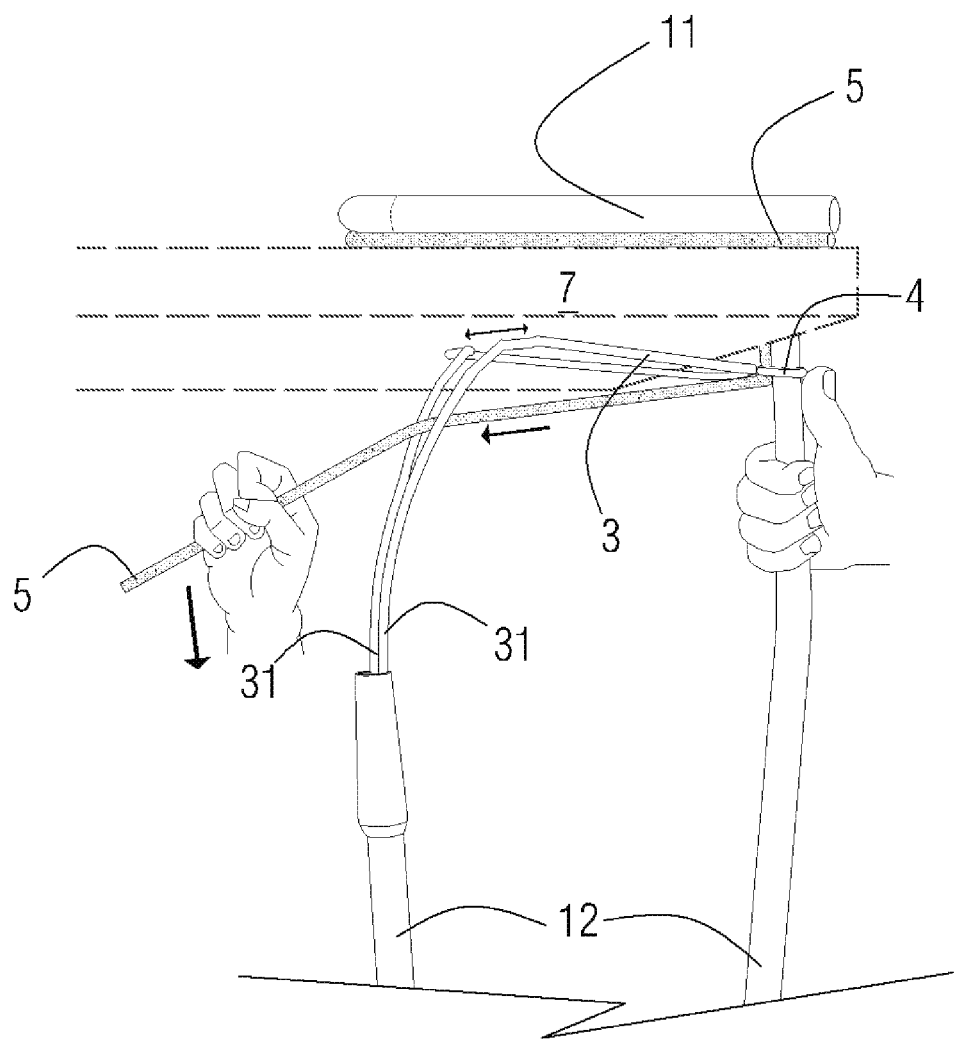

The user should then proceed to manually pass and stretch the tensor 5 through the gap between the bifurcated ends 31 of the fork 3, forcing a slight separation of the bifurcated ends 31, as is observed by the arrows of FIGS. 6 and 7 as well as in the expanded details thereof.

Figure 8:
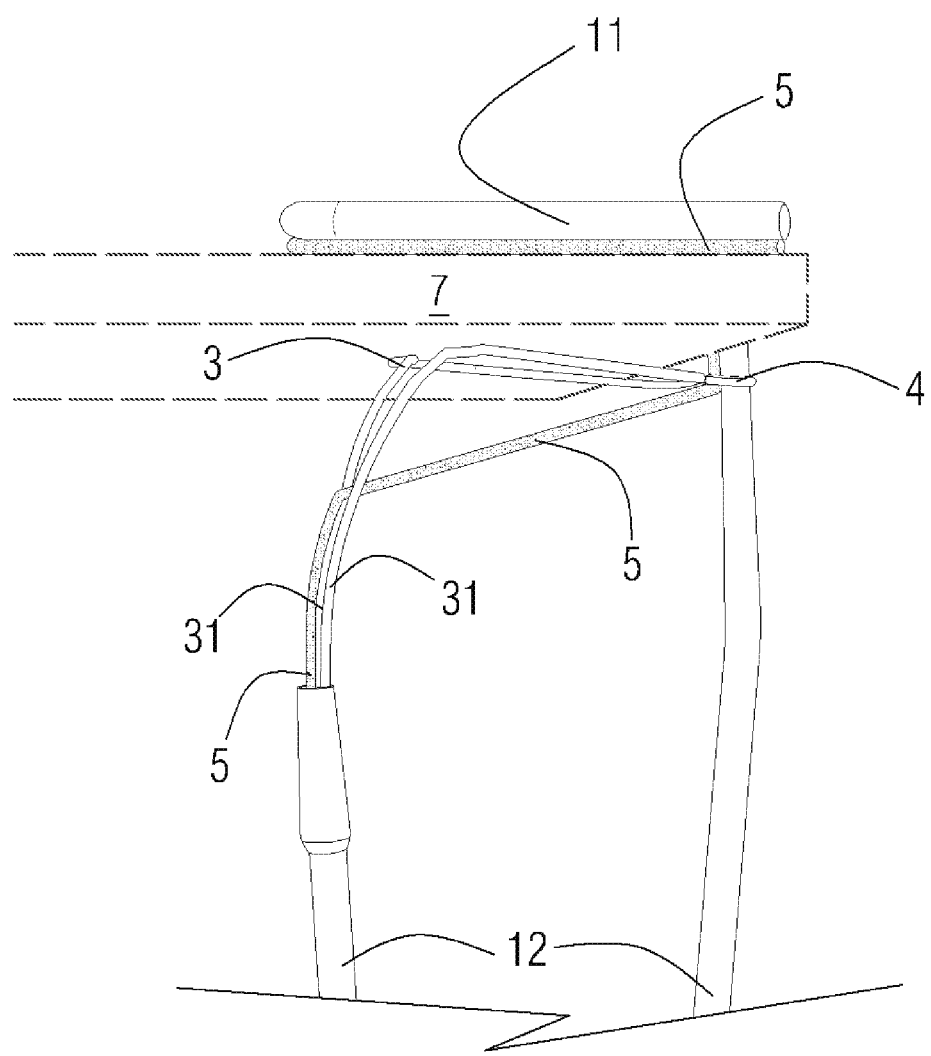

The stretching should be continued until it is ensured that the tensor 5 is encapsulated and fixed between the gap of the bifurcated ends 31 of the fork 3, whereby and also upon passing the tensor 5 through the interior of the ring 4 and being supported on said ring 4, the stress of the tension thereof is transmitted to the fork 3, which involves the fork 3 losing its state of flexibility and becoming rigid, as is depicted in FIG. 8.

Therefore and as is visualized in FIG. 8, the notably flat exterior body 7 is embedded, tightened and fixed between the base 11 and the fork 3, and the tension of the tensor 5 confers sufficient rigidity on the fork 3 so that it loses its flexibility, and the notably flat exterior body 7 can remain tightened against the base 11.

In order to proceed to remove the notably flat exterior body 7, it is sufficient to remove the tensor 5 from the adjusted position thereof in the gap of the bifurcated ends 31 of the fork 3, whereby the tensor 5 loses tension and therefore the fork 3 loses rigidity and recovers its flexibility, the notably flat exterior body 7 not tightening against the base 11, and allowing it to be able to be removed without difficulty.

Figure 9:
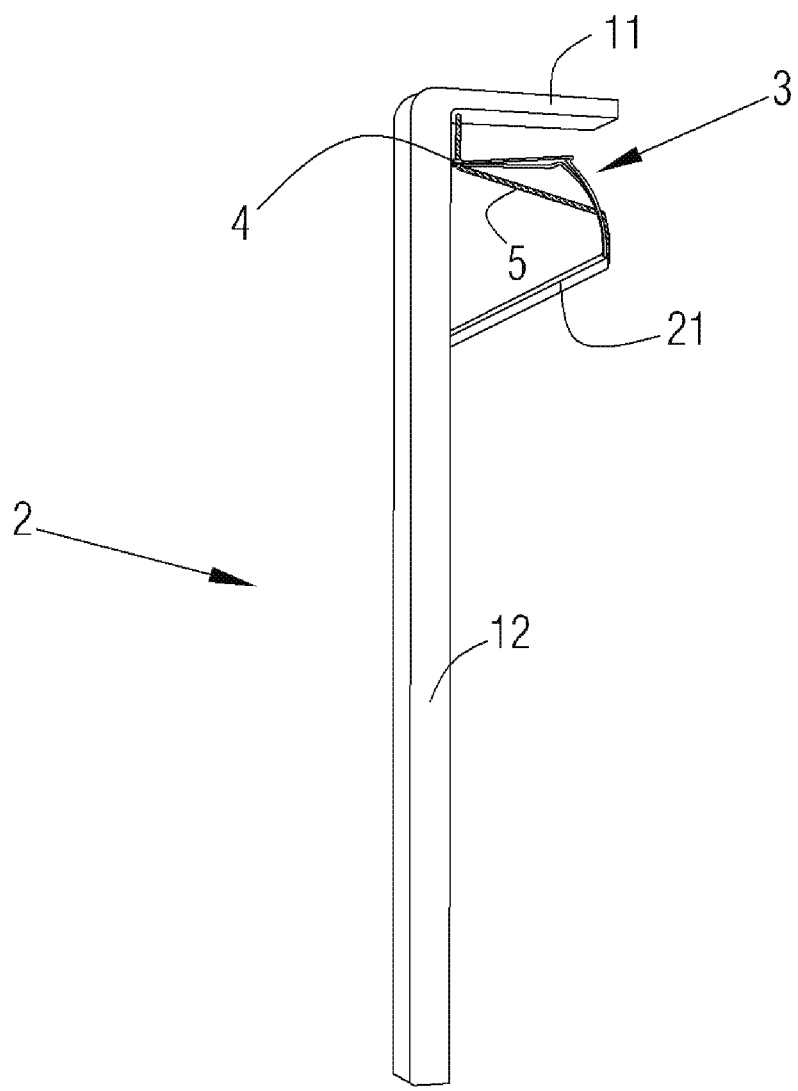
FIG. 9 is a general and perspective view of another preferred embodiment of the constituent device for furniture of the present invention.
Figure 10:
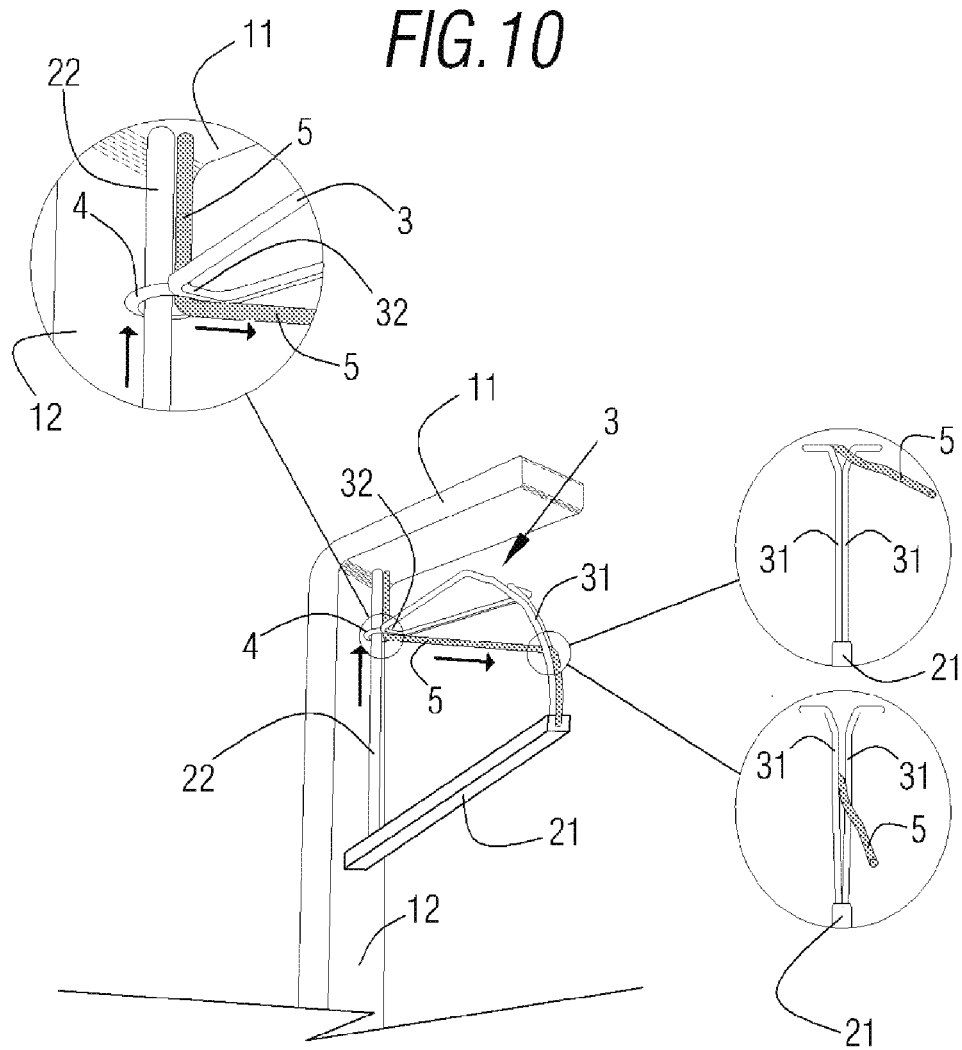
FIG. 10 is a view with details of the elastic means and of the fixing means of the preferred embodiment of the constituent device for furniture of the present invention depicted in FIG. 9.

Another possible preferred embodiment similar to that previously explained appears depicted in FIGS. 9 and 10.

As can be observed in FIGS. 9 and 10, in this other preferred embodiment, the base 11 and the strut 12 form a single elongated piece with a notably rectangular transversal section 2.

In a similar manner to the preferred embodiment previously described, in this embodiment the elastic means is implemented by an element in the manner of a fork 3 and with an elastic nature. As can be observed in greater detail in FIG. 10 and the expanded details thereof, the bifurcated ends 31 of the fork 3 are inserted and fixed together in the strut 12 (in this preferred embodiment in a projection 21 made for such purpose in the elongated piece with notably rectangular transversal section 2, in which the strut 12 is integrated).

The other single end or vertex 32 of the fork 3 is movably connected in the region of the piece with rectangular section close to the joining between the base 11 and the strut 12. Said connection is implemented by a ring 4.

Said ring 4 is joined to the single end or vertex 32 of the fork 3, and a bolt 22 situated and fixed between the base 11 and the projection 21 is annularly inserted into the ring 4, in the region of the elongated piece with notably rectangular transversal section 2 close to the joining between the base 11 and the strut 12 and therefore the ring 4 has a position displaceable in relation to the proximity thereof to the base 11, as can be observed by the arrow in FIG. 10 and the expanded detail thereof.

Like in the preferred embodiment previously explained, the fork 3 and the ring 4 can form a single piece.

The fixing means is implemented by a tensor 5, immovable at one of the ends thereof in the base 11, as is especially observed in FIG. 10 and the expanded detail thereof.

The tensor 5 also passes through the interior of the ring 4 in a coaxially and simultaneous manner and contiguously to the bolt 22 situated and fixed between the base 11 and the projection 21, as is especially observed by the other arrow in FIG. 10 itself and in the expanded detail thereof.

After its passage through the interior of the ring 4, the tensor 5 continues its course until being introduced, adjusted and fixed in the working gap between the bifurcated ends 31 of the fork 3, in a position close to the insertion of said bifurcated ends 31 in the strut 12 (in this preferred embodiment in the projection 21 made for such purpose of the notably rectangular transversal section 2, in which the strut 12 is integrated), as is observed in the expanded details of FIG. 10, and similar to the preferred embodiment previously explained.

The manner of proceeding with the insertion of the notably flat exterior body 7 is the same as that explained in the previous preferred embodiment. The user should proceed to manually move the ring 4 through the bolt 22 in the direction indicated by the arrow of FIG. 10 and the expanded detail thereof until the notably flat exterior body 7 is suitably housed between the base 11 and the fork 3.

Then, the user should proceed to manually pass and stretch the tensor 5 through the gap between the bifurcated ends 31 of the fork 3, forcing a slight separation of the bifurcated ends 31, as is observed in FIG. 10 and the expanded details thereof and in a very similar manner to the preferred embodiment previously explained.

The user should continue manually stretching the tensor 5 until ensuring that the tensor 5 is encapsulated and fixed between the gap of the bifurcated ends 31 of the fork 3, whereby and also upon passing the tensor 5 through the interior of the ring 4 and being supported on said ring 4, the stress of the tension thereof is transmitted to the fork 3, which involves the fork 3 losing its state of flexibility and becoming rigid, and with the notably flat exterior body 7 embedded, tightened and fixed between the base 11 and the fork 3, and the tension of the tensor 5 confers sufficient rigidity on the fork 3 so that it loses its flexibility, and the notably flat exterior body 7 can remain tightened against the base 11.

In the same way as in the preferred embodiment previously explained, in order to proceed to remove the notably flat exterior body 7, it is sufficient for the user to remove the tensor 5 from the adjusted position thereof in the gap between the bifurcated ends 31 of the fork 3, whereby the tensor 5 loses tension and therefore the fork 3 loses rigidity and recovers its flexibility, leaving the notably flat exterior body 7 to be tightened against the base 11, and allowing it to be able to be removed from the position thereof without difficulty.

Another possible preferred embodiment appears depicted in FIGS. 11 to 17.

Figure 11:
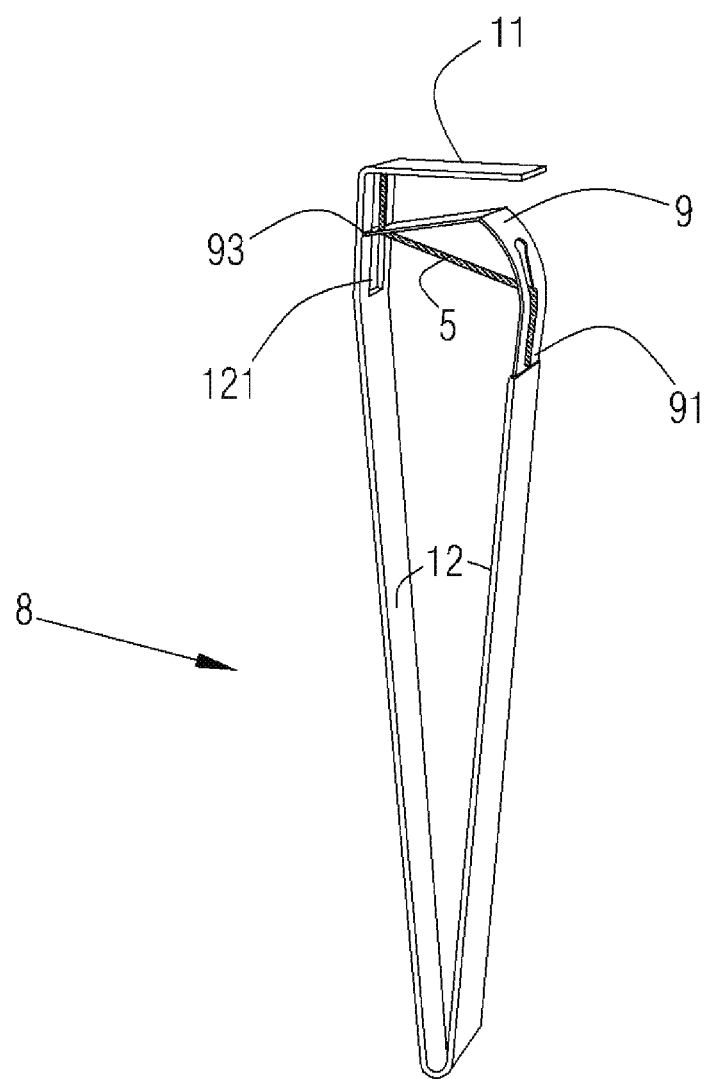
FIGS. 11 and 12 are general views and from different perspectives of another preferred embodiment of the constituent device for furniture of the present invention.
Figure 12:
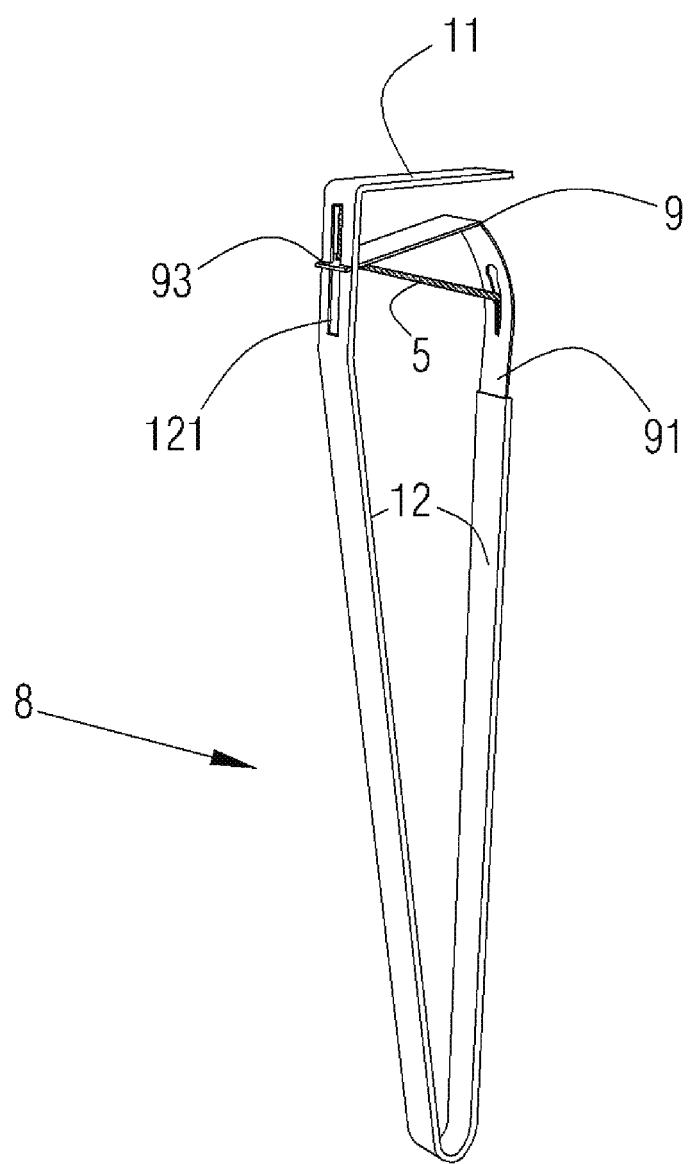

As can especially be observed in FIGS. 11 and 12, in this other preferred embodiment, the base 11 and the strut 12 form a single elongated laminar piece 8.

In a similar way to the preferred embodiments previously described, in this other embodiment, the elastic means is implemented by an element in the manner of a flat spring 9 and with an elastic nature. As can be observed in greater detail in FIG. 13 and the expanded details thereof, the flat spring 9 has one of the ends thereof 91 inserted in the strut 12 (in this preferred embodiment at one end of the elongated laminar piece 8, in which the strut 12 is integrated).

Figure 13:
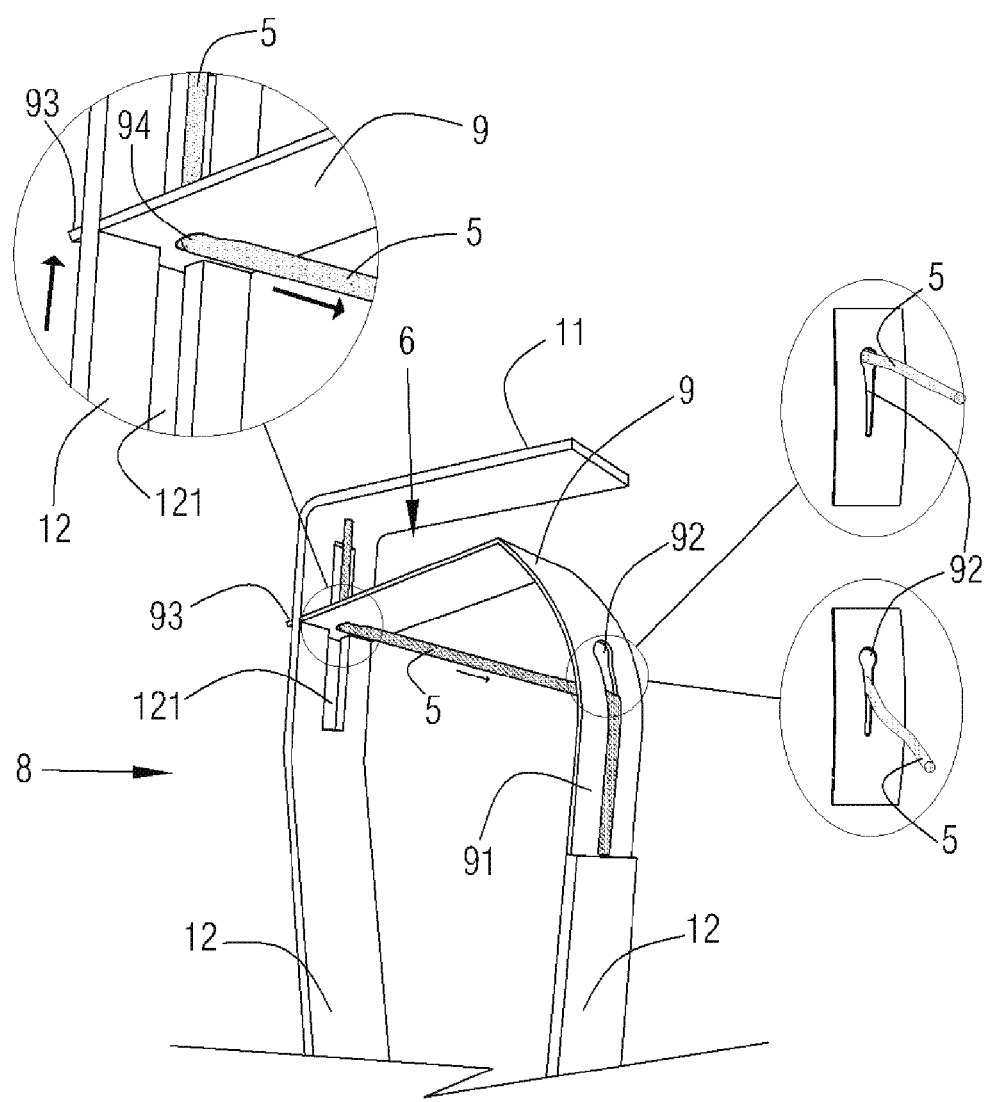
FIG. 13 is a view with details of the elastic means and of the fixing means of the preferred embodiment of the constituent device for furniture of the present invention depicted in FIGS. 11 and 12.

A notably elongated opening 92 with a progressive narrowing is located in said end 91 and in a position close to the insertion thereof in the strut 12, as is observed in greater detail in the expanded details of FIG. 13.

The other end 93 of the flat spring 9 is movably connected in the region of the elongated laminar piece 8 close to the joining between the base 11 and the strut 12. Said connection is implemented by an elongated notch 121 present in said region of the elongated laminar piece 8 (as can also be observed in FIGS. 11 and 12) and such that the movable end 93 of the flat spring 9 is passed through and introduced in said notch 121 and can only be displaced in said notch 121 in the direction indicated by the arrow of the expanded detail of FIG. 13.

The flat spring 9 also has a hole 94 close to the movable end thereof 93, as is also observed in the expanded detail of FIG. 13.

In a similar manner to the preferred embodiments previously described, in this other embodiment, the fixing means is implemented by a tensor 5, immovable at one of the ends thereof in the base 11, as is especially observed in FIG. 13.

The tensor 5 also passes through the interior of the hole 94 close to the movable end 93 of the flat spring 9, as is especially observed in the expanded detail of FIG. 13.

After its passage through the interior of the hole 94, the tensor 5 continues its course until being introduced, adjusted and fixed in the working gap produced by the progressive narrowing of the elongated opening 92 of the flat spring 9 in a position close to the insertion of the flat spring 9 in the strut 12 (in this preferred embodiment, in one end of the elongated laminar piece 8 consisting of the base 11 and the strut 12), as is observed in the expanded details of FIG. 13.

In a similar manner to the previous preferred embodiments, the different positions of the movable end 93 of the laminar spring 9 along the elongated notch 121 also involve determining the different states of bending and positioning of the laminar spring 9 itself and also determining the width 61 of the useful space 6 between the laminar spring 9 and the base 11 and consequently adapting it to the thickness of the notably flat exterior body 7 which is desired to be introduced.

In the succession of FIGS. 14 to 17, it can be observed how the user should proceed to manually introduce and adjust the notably flat exterior body 7 as desired in the useful space between the flat spring 9 and the base 11.

Figure 14:
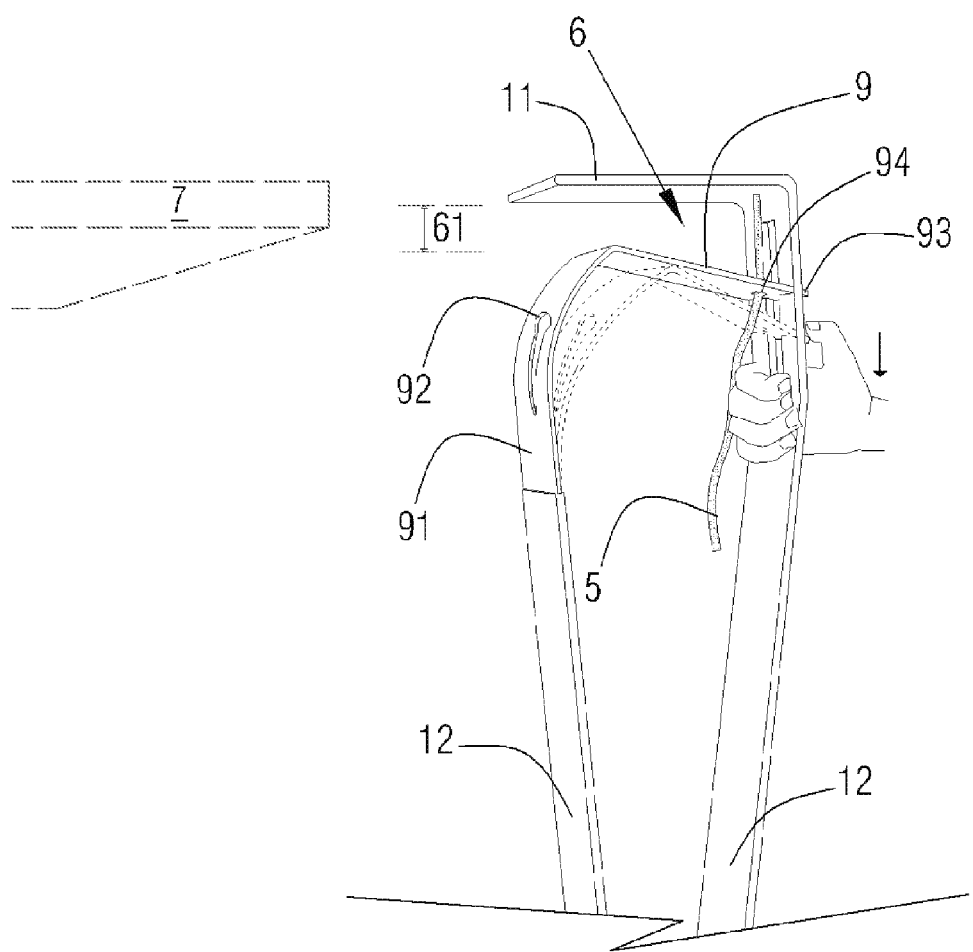
FIGS. 14, 15, 16 and 17 are sequential views of how the user should proceed to use the preferred embodiment of the constituent device for furniture of the present invention depicted in FIGS. 11 and 12.
Figure 15:
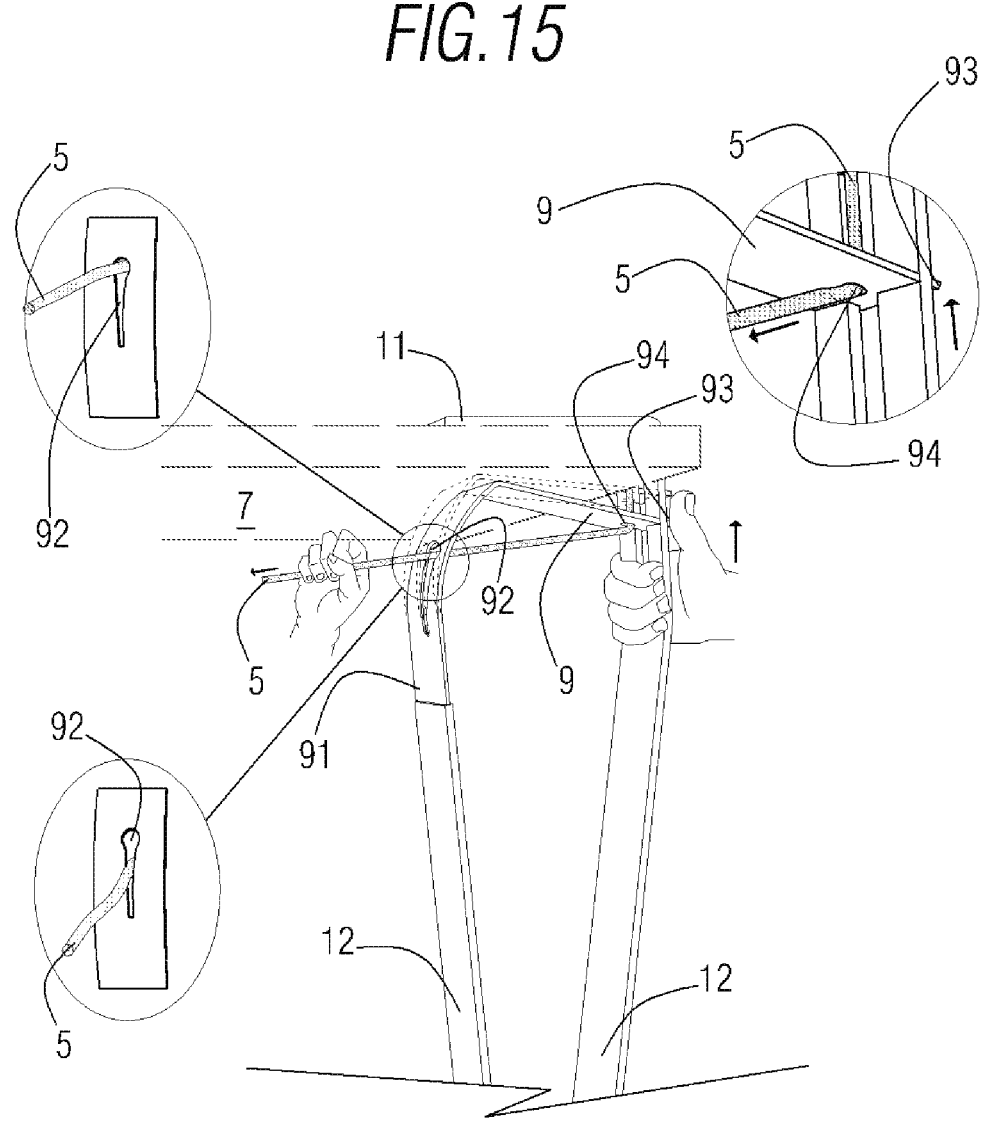

The user, as is visualized in FIG. 14, should manually push the end 93 of the flat spring 9 in the direction indicated by the arrow and therefore bending the flat spring 9 to the position depicted by lines, increasing the width 61 of the useful space 6 until the notably flat exterior body 7 can pass and be housed in the useful space 6 which is between the base 11 and the flat spring 9, as is also observed in FIG. 15 and in the expanded details thereof.

Then, once the notably flat exterior body 7 is housed in the useful space 6, the end 93 of the flat spring 9 should be pushed in the direction indicated by the arrow of FIG. 15 until the flat spring 9 is in the position depicted by lines and suitably tightens the notably flat exterior body 7 against the base 11.

Figure 16:
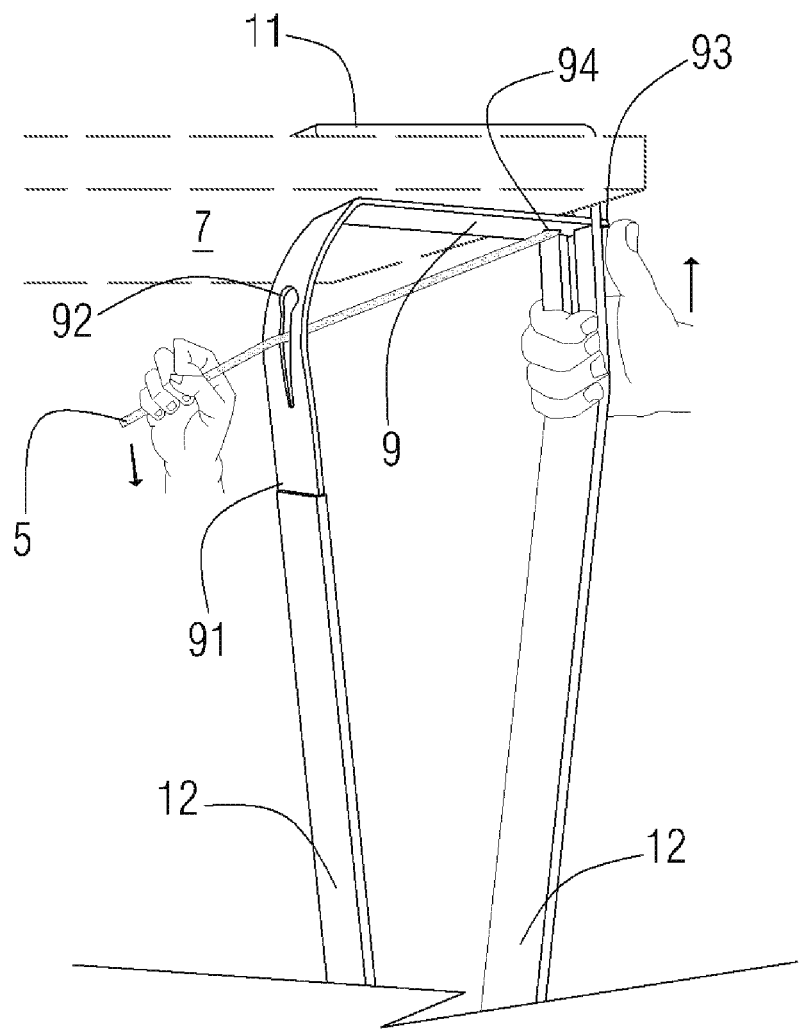

Then, the user should proceed to manually pass and stretch the tensor 5 through the working gap resulting from the progressive stretching of the notably elongated opening 92 of the flat spring 9, as is observed by the arrows of FIGS. 15 and 16.

Figure 17:
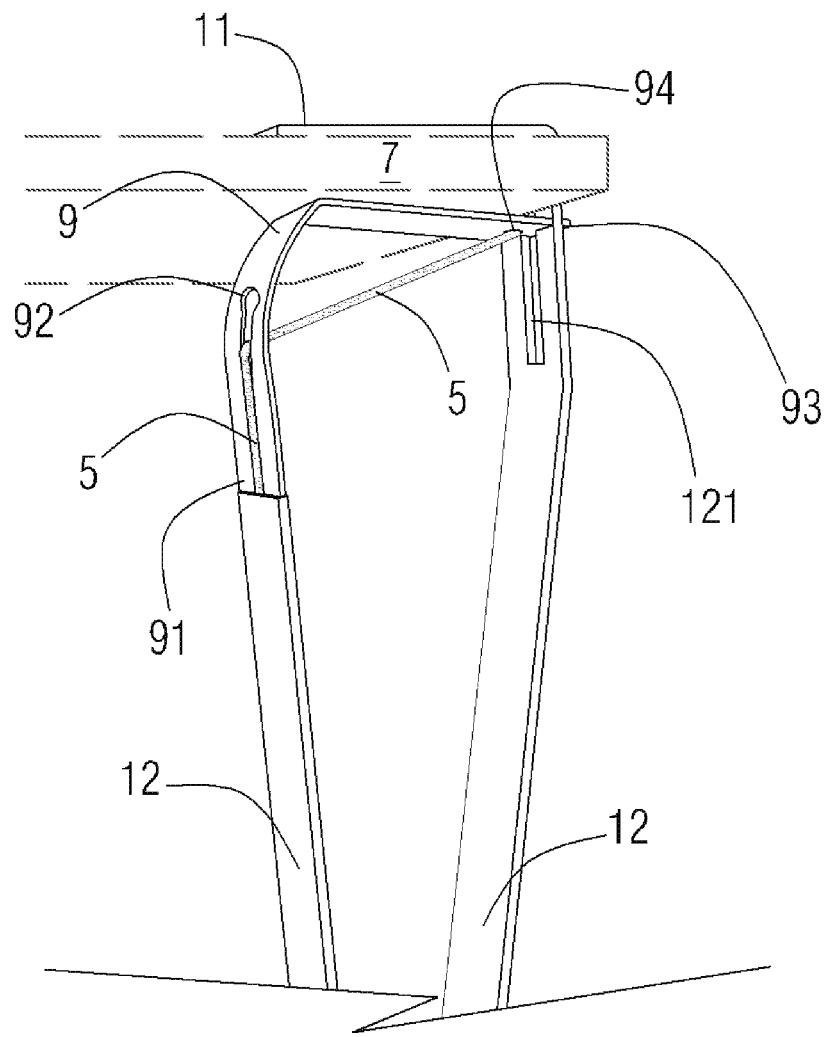

The user should continue manually stretching the tensor 5 until ensuring that the tensor 5 is encapsulated and fixed between the working gap produced by the progressive stretching of the opening 92 of the flat spring 9, whereby and also upon passing the tensor 5 through the interior of the hole 94 and being supported on said hole 94, the stress of the tension thereof is transmitted to the flat spring 9, which involves said flat spring 9 losing its state of flexibility and becoming rigid, as is depicted in FIG. 17.

Therefore and as is visualized in FIG. 17, the notably flat exterior body 7 is embedded, tightened and fixed between the base 11 and the flat spring 9 and the tension of the tensor 5 confers rigidity on the flat spring 9 sufficient for it to lose its flexibility and for the notably flat exterior body 7 to be able to remain tightened against the base 11.

In order to proceed to remove the notably flat exterior body 7, it is sufficient to remove the tensor 5 from the adjusted position thereof in the gap resulting from the progressive stretching of the opening 92 of the flat spring 9, whereby the tensor 5 loses tension and therefore the flat spring 9 loses rigidity and recovers its flexibility, the notably flat exterior body 7 not tightening against the base 11, and allowing it to be able to be removed without difficulty.

The present invention, as can be observed in the preferred embodiments explained and set out as an example, allows easy and quick manipulation of the elastic means and fixing means without the need for tools, the elastic means being able to be fixed with only one manual movement. The fixing means, in these preferred embodiments, a tensor 5, locks the elastic means, in these preferred embodiments, a fork 3 or a flat spring 9, locking the elastic capacity thereof, once it has been adjusted to the thickness of the notably flat exterior body 7.

The movement of the elastic means, a fork 3 or a flat spring 9 in these preferred embodiments is guided so that the displacement is in only one direction, owing to the geometry of the invention and also of the elastic means itself. In this way, the movement of the elastic means is directed and delimited, with suitably simple geometry and a reduced number of elements forming the invention.

In other preferred embodiments, the constituent device for furniture of the invention, can be provided with a continuous pressure or tightening means, capable of conferring continuous pressure or tightening on the fixing means so that said fixing means can remain fastened and adjusted with high effectiveness, for example by means of friction.

The present invention is coupled to the notably flat exterior body 7 in a very stable manner, while it facilitates the positioning of said notably flat exterior body 7.

Figure 18:
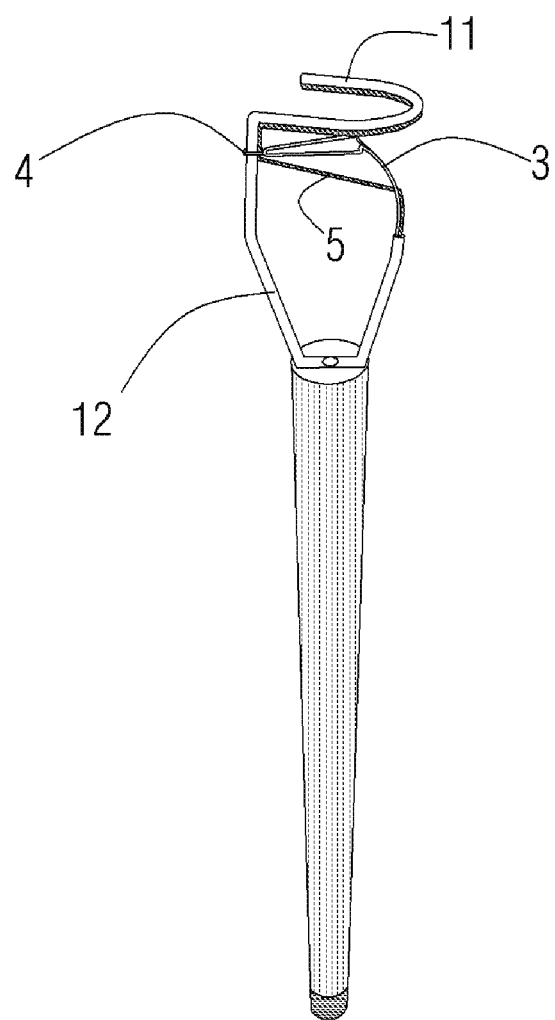
FIGS. 18 and 19 are general views of other possible preferred embodiments of the constituent device for furniture of the present invention.

In other preferred embodiments, the constituent device for furniture of the invention can have other multiple configurations, such as for example that depicted in FIG. 18.

Figure 19:
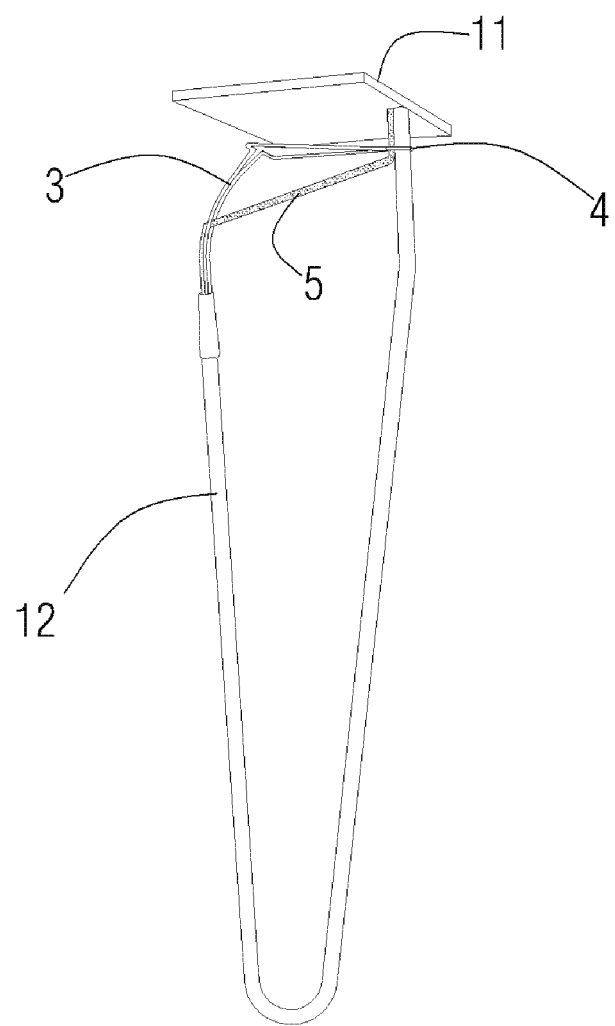

In other preferred embodiments, the base 11 and the strut 12 can also have multiple different arrangements and configurations, as is, for example depicted in FIG. 19.

Depending on the requirements of the user, the notably flat exterior body 7 can be the flat surface of a type of furniture such as a table or shelf, for example.

In said case, the constituent device for furniture of the invention can be used in the manner of legs of a table, as is depicted in FIG. 20.

Figure 21:
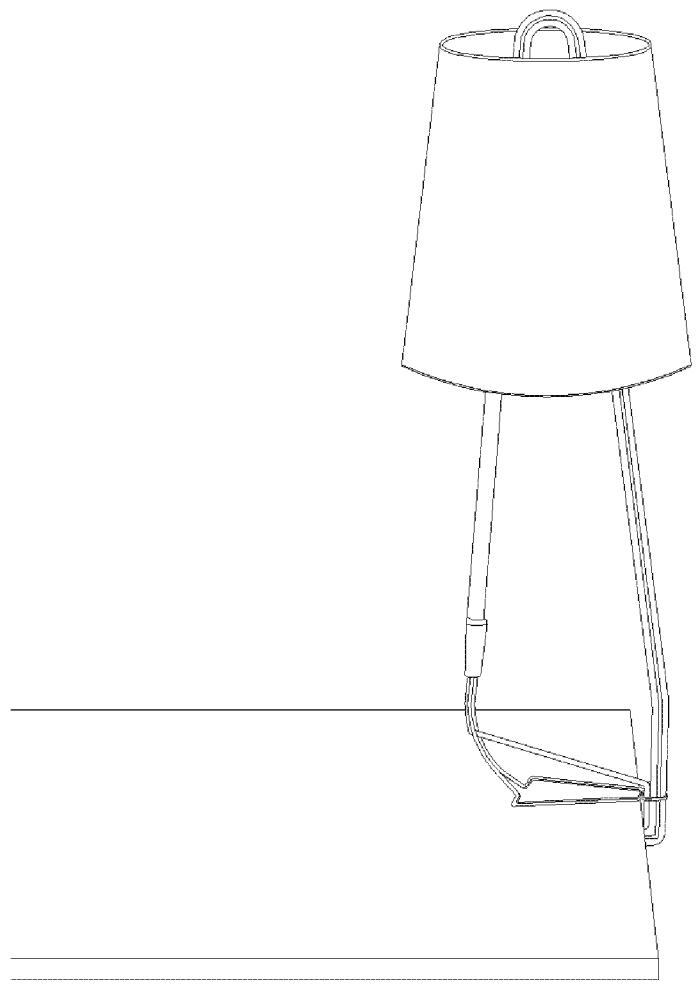
FIG. 21 is a view of the use as a lamp of a preferred embodiment of the constituent device for furniture of the present invention.
Figure 22:
FIG. 22 is a view of the use as a support for a shelf structure of a preferred embodiment of the constituent device for furniture of the present invention.

It can also be used, for example as a central support or body for a type of furniture such as a lamp, as is depicted in FIG. 21 or as a support for a shelf structure, as is observed in FIG. 22.

The details, the forms, the dimensions and other accessory elements as well as the materials used in the manufacture of the constituent device for furniture of the invention, can be conveniently substituted for others which are technically equivalent and do not depart from the essence of the invention or from the scope defined by the claims which are included below.

What is claimed is:

1. A constituent device for furniture, which comprises a base (11) and a strut (12), such that said base (11) and said strut (12) are joined to each other and in a notably perpendicular mutual position and wherein said device comprises an elastic means and a fixing means, the elastic means being a solid element of elongated nature and linked simultaneously to the base (11) and the strut (12) and also being in a position interposed in a joining region between the base (11) and the strut (12) and said elastic means being fixedly connected on the strut (12) and also connected in a movable position close to the joining between the base (11) and the strut (12), in which said elastic means is enabled and in a suitable position for the interposition between said elastic means and the base (11) of a notably flat exterior body (7), and the fixing means has the capacity to fix to said elastic means in an immovable and rigid position with the notably flat exterior body (7) embedded and tightened between the elastic means and the base (11); and said fixing means is implemented by a tensor (5) fixed at one of its ends thereof on the base (11) or on the strut (12), a section of another end of the tensor (5) being adjustable in a movable position on the base (11), strut (12) or elastic means, such that the tensor itself (5) passes through and is supported by the elastic means and transmits tension to said elastic means.

2. The constituent device for furniture according to claim 1, wherein the tensor (5) is notably similar to a cord.

3. The constituent device for furniture according to claim 1, wherein the elastic means is implemented by a tubular element in the manner of a fork (3) such that its bifurcated ends (31) are inserted immovably and together in the strut (12) and its other single end or vertex (32) being movably connected in a joining region between the base (11) and the strut (12) in a position displaceable in relation to the proximity thereof to the base (11).

4. The constituent device for furniture according to claim 3, wherein the single end or vertex (32) of the fork (3) is joined to a ring (4) annularly displaceable through the strut (12).

5. The constituent device for furniture according to claim 1, wherein the elastic means is implemented by a tubular element in the manner of a fork (3) such that its bifurcated ends (31) are inserted immovably and together in a projection (21) made for such purpose in the strut (12) and its other end or vertex (32) being movably connected in a joining region between the base (11) and the strut (12) in a position displaceable in relation to the proximity thereof to the base (11).

6. The constituent device for furniture according to claim 5, wherein the single end or vertex (32) of the fork (3) is joined to a ring (4) annularly displaceable through a bolt (22), said bolt (22) being situated and fixed between the base (11) and the projection (21).

7. The constituent device for furniture according to claim 1, wherein the elastic means is implemented by an element in the manner of a flat spring (9) such that one of its ends (91) thereof is immovably inserted in the strut (12) and its other end (93) of said flat spring (9) being movably connected in the joining region between the base (11) and the strut (12) in a position displaceable in relation to the proximity thereof to the base (11).

8. The constituent device for furniture according to claim 7, wherein the flat spring (9) has a hole (94) close to its movable connection region thereof with the strut (12), and it has, in another close position at the immovably inserted end (91), a notably elongated opening (92) with a progressive narrowing.

9. The constituent device for furniture according to claim 8, wherein the strut (12) has, in its region thereof close to the joining thereof with the base (11), an elongated notch (121) such that the movable end (93) of the flat spring (9) is passed through and introduced into said notch (121) and said movable end (93) being displaceable in the direction marked by the notch (121).

10. The constituent device for furniture according to claim 4, wherein the fixing means is implemented by a tensor (5) fixed on a section close to one of its ends thereof on the base (11), such that the tensor (5) passes through the interior of the ring (4) and the section of the tensor (5) close to its other end is adjustable and fixable in a working gap between the bifurcated ends (31) of the fork (3) in a position close to the immovable region of said bifurcated ends (31).

11. The constituent device for furniture according to claim 8, wherein the tensor (5) of the fixing means is fixed at one of its ends thereof on the base (11) such that the tensor (5)

passes through the interior of the hole (94) and a section of the tensor (5) close to its other end is adjustable and fixable in a working gap resulting from the progressive narrowing of the notably elongated opening (92).

12. The constituent device for furniture according to claim 4, wherein the fork (3) and the ring (4) form one single piece.

13. The constituent device for furniture according to claim 1, wherein said device comprises a continuous pressure or tightening means which confers continuous pressure or tightening on the fixing means such that said fixing means remains fastened and adjusted by the action of the continuous pressure or tightening means.

14. The constituent device for furniture according to claim 2, wherein it comprises a continuous pressure or tightening means which confers continuous pressure or tightening on the fixing means such that said fixing means remains fastened and adjusted by the action of the continuous pressure or tightening means.

15. The constituent device for furniture according to claim 6, wherein the fixing means is implemented by a tensor (5) fixed on the section close to one of its ends thereof on the base (11), such that the tensor (5) passes through the interior of the ring (4) and a section of the tensor (5) close to its other end is adjustable and fixable in a working gap between the bifurcated ends (31) of the fork (3) in a position close to the immovable region of said bifurcated ends (31).

16. The constituent device for furniture according to claim 5, wherein the fork (3) and the ring (4) form one single piece.

17. The constituent device for furniture according to claim 6, wherein the fork (3) and the ring (4) form one single piece.

18. The constituent device for furniture according to claim 2, wherein the elastic means is implemented by an element in the manner of a flat spring (9) such that one of its ends thereof (91) is immovably inserted in the strut (12) and its other end (93) of said flat spring (9) being movably connected in a joining region between the base (11) and the strut (12) in a position displaceable in relation to the proximity thereof to the base (11).

19. The constituent device for furniture according to claim 2, wherein the elastic means is implemented by a tubular element in the manner of a fork (3) such that its bifurcated ends (31) are inserted immovably and together in the strut (12) and its other single end or vertex (32) being movably connected in a joining region between the base (11) and the strut (12) in a position displaceable in relation to the proximity thereof to the base (11).

20. The constituent device for furniture according to claim 2, wherein the elastic means is implemented by a tubular element in the manner of a fork (3) such that its bifurcated ends (31) are inserted immovably and together in a projection (21) made for such purpose in the strut (12) and its other end or vertex (32) being movably connected in a joining region between the base (11) and the strut (12) in a position displaceable in relation to the proximity thereof to the base (11).

* * * * *